United States Patent [19]

Davis, Sr.

[11] 4,423,853

[45] Jan. 3, 1984

[54] CABLE-STRINGING SUPPORT BLOCK

[76] Inventor: Daniel R. Davis, Sr., 692 Ralph Rd., Conyers, Ga. 30207

[21] Appl. No.: 290,016

[22] Filed: Aug. 4, 1981

Related U.S. Application Data

[63] Continuation of Ser. No. 102,892, Dec. 12, 1979, abandoned.

[51] Int. Cl.³ .............................................. B66D 3/04
[52] U.S. Cl. .............................. 254/390; 254/134.3 R; 254/393
[58] Field of Search ............... 254/388, 390, 393, 402, 254/409, 410, 411, 412, 394, 134.3 R, 134.3 CL, 134.3 PA

[56] References Cited

U.S. PATENT DOCUMENTS

| 705,101 | 7/1902 | Lemaire | 254/388 |
|---|---|---|---|
| 3,109,627 | 11/1963 | Stanulis et al. | 254/134.3 R |
| 3,134,575 | 5/1964 | Walter | 254/409 X |
| 3,596,878 | 8/1971 | Parsen | 254/134.3 R |
| 3,834,674 | 9/1974 | Jackson | 254/394 |
| 3,853,304 | 12/1974 | Jackson | 254/394 |
| 4,019,715 | 4/1977 | Vugrek | 254/134.3 R |

FOREIGN PATENT DOCUMENTS 363453 9/1962 Switzerland ..................... 254/394

Primary Examiner—Billy S. Taylor
Attorney, Agent, or Firm—Harry I. Leon; V. L. Leon

[57] ABSTRACT

A support block for stringing one or two cables simultaneously which is hung from an existing cable suspended laterally overhead, in which the cable-to-be-strung can be rapidly inserted, and on which the cable-to-be-strung rests prior to its being lashed to a utility pole. The temporary support block is raised to the existing cable by means of a layup stick or similar hand-held installation pole by a worker standing on the ground. More than one support block can be hung and cable suspended therefrom before the cable is pulled between one or more utility poles. The method of using several support blocks reduces the frequency with which workers must put tension on a cable in order to string it and enables the workers to keep greater lengths of cable suspended above potentially-damaging ground traffic and obstacles.

4 Claims, 6 Drawing Figures

CABLE-STRINGING SUPPORT BLOCK

This is a continuation of application Ser. No. 102,892, filed Dec. 12, 1979 and now abandoned.

BACKGROUND OF THE INVENTION

1. Field of the Invention

This invention relates generally to an apparatus and method for supporting cable during its installation and more particularly to an apparatus for supporting cable which is suspended from an existing overhead cable and to a method incorporating several such apparatus to suspend long sections of a cable above ground during most of its installation.

2. Description of the Prior Art

In the method presently in common use for stringing cables between utility poles, a cable is secured temporarily, under tension, to a fastener attached to the first pole in the line to which the cable will be strung. Workers then pull the cable by means of a block and tackle, a wench, or their own manpower and secure the cable temporarily to the next pole. The position of the means of pulling the cable must be changed frequently; for heavier cables, this position must be changed with each new pole. In this method, the pulling means has to lift and hold the full weight of the cable. Not only is this method time-consuming, but it also puts stress on the cables themselves. Furthermore, because the cables being installed are on the ground for considerable periods of time, the cables are subject to damage from ground traffic. Additionally, the cables can be damaged by obstacles such as tree limbs which may lie in the path of the cable being raised. The interference of ground traffic and such obstacles with the cable often leads to injury to the personnel installing the cable.

SUMMARY OF THE INVENTION

A support block according to the present invention which comprises a means for receiving the end of a hand-held installation pole and which can be hung from an existing cable at a point above the path along which the cable is to be strung is provided. An opening in each support block allows cable to be rapidly passed therethrough and to be laid across a grooved roller rotatably mounted therein. The roller rotates as cable is pulled across it through the support block and tensioned.

By using a plurality of support blocks hung from the existing cable at several points above the path along which the cable is to be strung, lengths of cable several times in excess of the average distance between utility poles can be quickly suspended above the ground in order to reduce the chance of damage to the cables from ground traffic.

A bumper attached to one of the upper ends of each support block prevents an adjacent support block from being pulled onto the end of a support block to which the bumper is attached as the cable is pulled. The bumper also prevents cable lashing machinery from riding up over the support block and, in so doing, damaging the cable.

In view of the foregoing, an object of this invention is to provide a method for greatly increasing the rate at which cables can be strung and at the same time reducing the chance of injuring workers and of damaging cables during cable-stringing operations.

A further object of the present invention is to provide a support block as characterized above which is lightweight, but rugged and dependable in operation, and which is simple and inexpensive to manufacture.

The novel features which I consider characteristic of my invention are set forth with particularity in the appended claims. The device itself, however, both as to its organization and mode of operation, together with additional objects and advantages thereof, will best be understood from the following description of specific embodiments when read in connection with the accompanying drawings, in which:

BRIEF DESCRIPTION OF THE DRAWINGS

Like reference characters indicate corresponding parts throughout the several views of the drawings.

DESCRIPTION OF THE PREFERRED EMBODIMENTS

Figure 1:
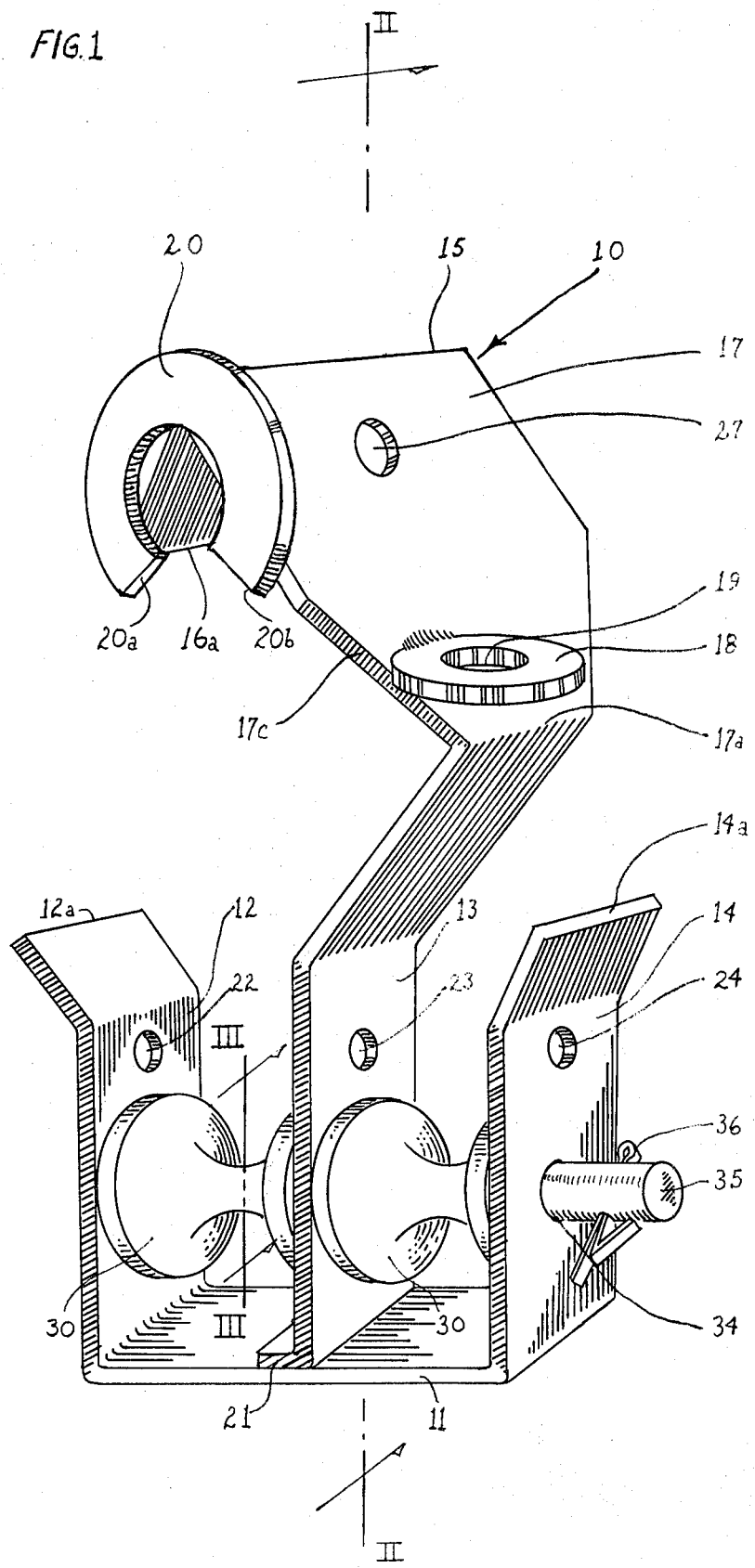
FIG. 1 is a perspective view showing one embodiment of the invention for stringing two cables.
Figure 2:
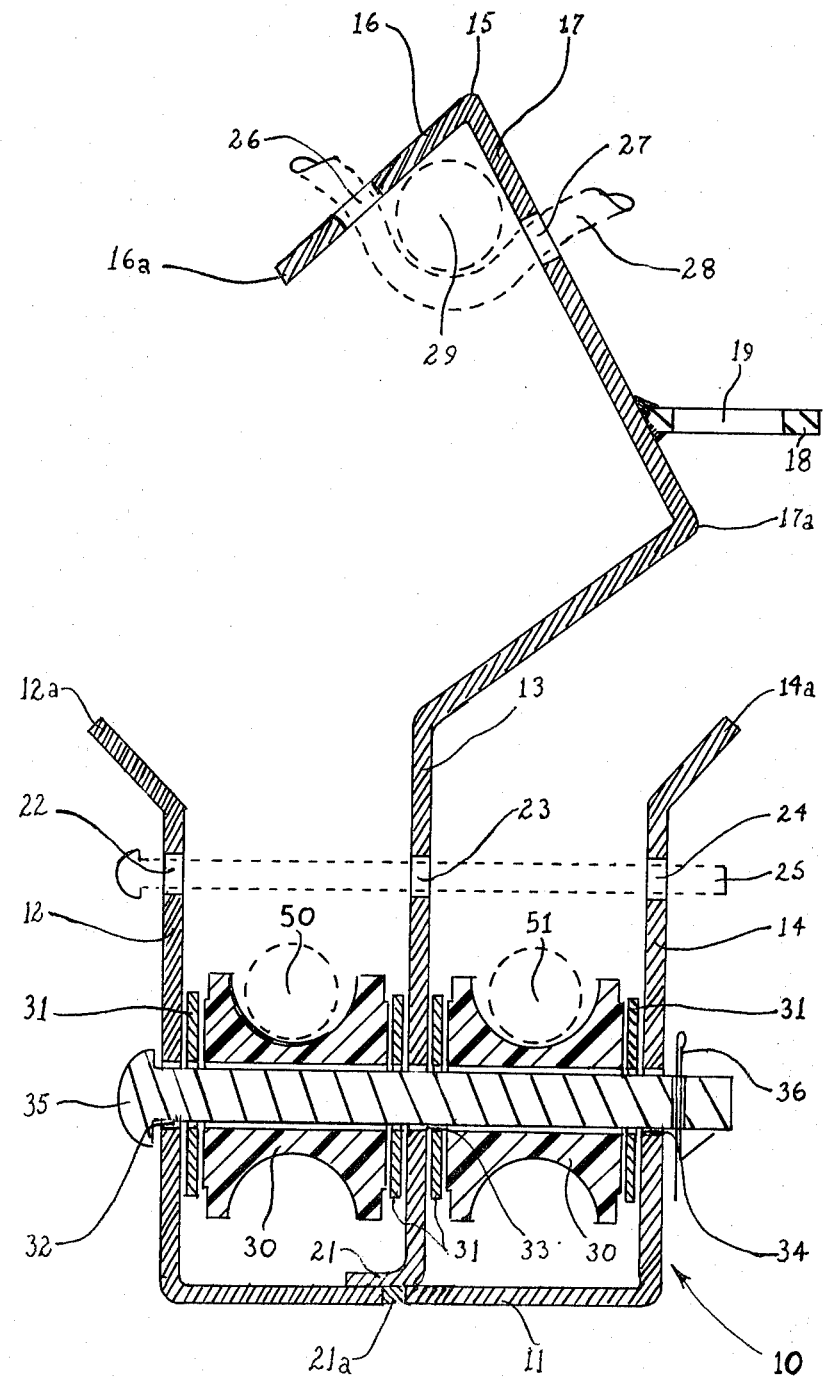
FIG. 2 is a cross-sectional view taken on line II—II of FIG. 1 on which are superimposed cross-sections of the existing cable and of a restraining means therefor and of the cables-to-be-strung and of a retaining pin therefor, the superimposed cross-sections being shown by broken lines.
Figure 3:
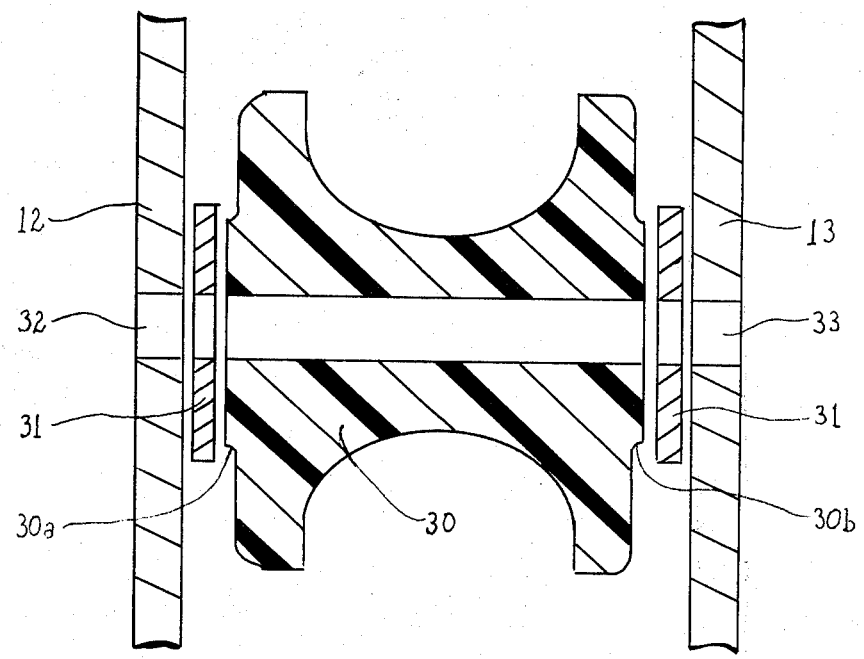
FIG. 3 is an enlarged cross-sectional view taken on line III—III of FIG. 1.

Referring to the drawings, and in particular to FIGS. 1-3, there is shown therein a cable-stringing support block for stringing two cables according to the present invention. It comprises a lightweight, rigid support member 10 formed of a material such as a hard plastic or one of the ductile alloys of steel, aluminum, copper, or the like.

Ridge 15 on the rigid support member 10 is formed by intersecting portions 16 and 17 which rest upon an existing cable 29 from which the support block is hung. As is seen most clearly in FIG. 2, ridge 15 is centered above a point which lies between the proximate faces of the rollers 30 connected to the support member as subsequently described herein. Further, the vertical plane in which ridge 15 is disposed passes between these roller faces. In operation, the weights of the support block and of the two cables 50 and 51 which it supports are balanced on either side of the dividing portion 13; as a result, the center of gravity of the support block and cables is located, during most of the cable installation operation, also between the proximate faces of the rollers. The placement of the ridge 15 over the center of gravity of the support block enables the support block to quickly assume an equilibrium position once it is hung from the cable 29 and to return to that position when it is displaced during the cable-stringing operation.

As is seen most clearly in FIG. 2, the intersecting portions 16 and 17 have holes 26 and 27 through which appropriate means such as a small piece of cable 28 may be inserted in order to restrain the movement of the support block relative to the cable 29. Movement of the support block along the cable 29 is limited by sliding friction between the support block and the cable 29, which is enhanced in the present invention by its having a ridge 15 which is several times longer than the diameter of the cable 29. This feature also allows the loads carried by the support block to be distributed over a longer section of the cable 29, thereby minimizing damage to it.

Opposing edges 12a and 16a in support member 10 are separated from each other by a distance which is greater than the diameter of cable 29, thus allowing sidewise movement of a section of cable which is disposed substantially parallel to the ridge 15 through the opening between these edges. A comparable distance separates the opposing edges 14a and 17a. It is important that the ridge 15 be straight as shown, but the opposing edges need not necessarily be straight.

Figure 4:
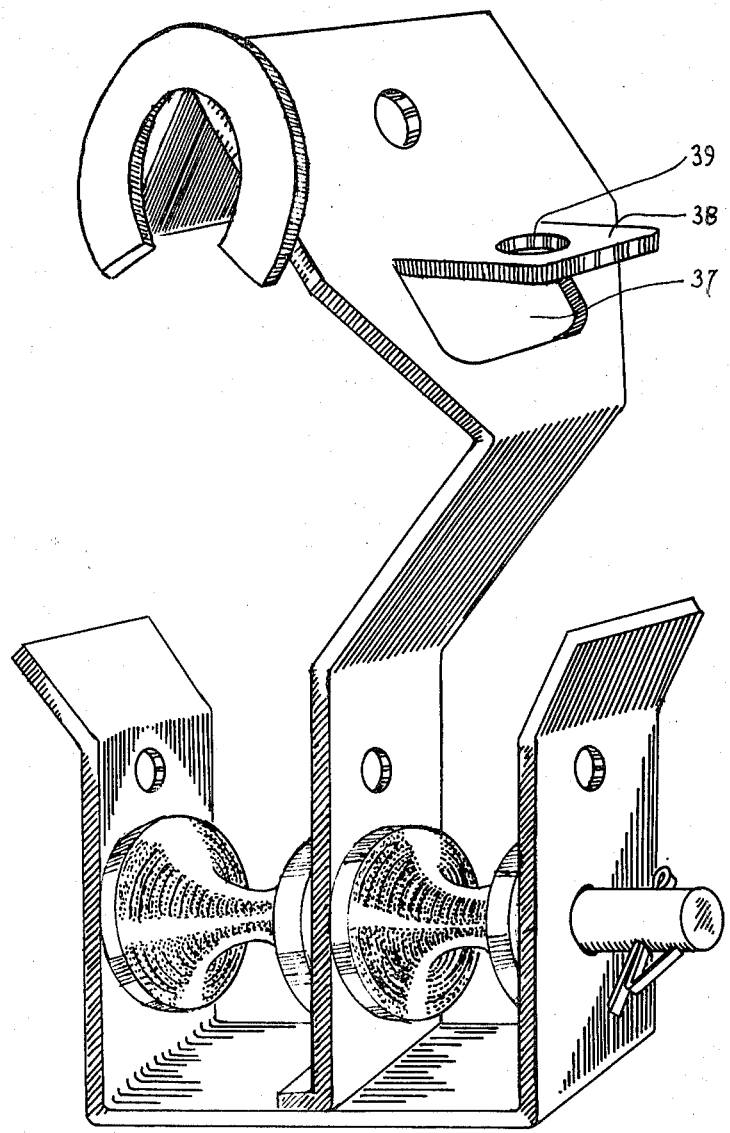
FIG. 4 is a perspective view showing an alternative embodiment of the invention for stringing two cables.

A means for receiving the end of a layup stick or similar hand-held installation pole, such as a lifting eye 18 having an aperture 19, is disposed horizontally from the outer surface of the intersecting portion 17 (FIG. 2) so that the support block can be raised vertically and hung from an existing overhead cable by a man standing on the ground. The lifting eye 18 is welded to the support member 10 in close proximity to the leading edge 17c and to the point at which the leading edge begins to taper inward so that no portion of the support block is disposed directly beneath the aperture 19, thereby facilitating the hanging of the support block. In an alternative embodiment shown in FIG. 4, the means for receiving the end of the installation pole comprises a lifting tab 38 formed from the support member and having an aperture 39; the lifting tab is disposed parallel to the horizontal base 11. This modification reduces the weight of the support block as well as its fabrication costs.

The rigid support member 10 may be formed in two parts which are rigidly connected to each other by welding. As such, the tip 21 is aligned parallel to the horizontal base 11 and welded thereto. As is seen in FIG. 2, a portion of the weld is disposed within a slot 21a provided in the base 11, thereby increasing the strength of the welded joint. It is to be understood that the invention is not limited to forming the rigid support member in two parts. The rigid support member could be formed by one-piece construction.

Hard-surfaced rollers 30 are made of a material such as hard nylon, hard rubber, or metal and may be grooved as seen in FIG. 2. The rollers 30 and washers 31 are rotatably connected to the support member 10 by any appropriate means such as a clevis pin 35 and a cotter pin 36. Rollers 30, washers 31, dividing portion 13, and vertical side portions 12 and 14 each have a hole formed therein for receiving the clevis pin 35. As shown most clearly in FIG. 2, the clevis pin 35 itself has a hole formed therein into which the cotter pin 36 is inserted in order to hold the support member 10, the clevis pin 35, the rollers 30, and the washers 31 in assembled relation.

As is best seen in FIG. 3, the washers 31 and the shoulders 30a and 30b on the roller 30 give clearance between the rims of the roller 30 and the proximate surfaces of the support member 10. Also, the roller 30 and two washers 31 when juxtaposed in direct physical contact with each other and with, for example, the proximate surface of the vertical side portion 12 have a maximum clearance of 1/32th inch between the proximate faces of the washer 31 and the dividing portion 13.

A similar maximum clearance obtains between the proximate faces of the washer 31 and the dividing portion 13 when the roller 30 and two washers 31 are juxtaposed in direct physical contact with each other and the vertical side portion 14. The washers lower the friction caused by the motion of the shoulders relative to the support member 10.

In operation, rollers 30 upon which cables 50 and 51 are supported rotate as these cables are pulled relative to the existing cable 29. The upper edges 12a and 14a of the side portions 12 and 14 are wholly disposed above the top surfaces of the cables 50 and 51 when they are supported on the rollers 30. The dividing portion 13 and the side portions 12 and 14 may have holes 23, 22 and 24, respectively, therein for receiving a retaining pin 25 to provide an additional restraint on the movement of the cables 50 and 51.

The heights of the edges 16a and 17a above the horizontal base 11 is limited by the necessity of keeping the height of the ridge 15 above the horizontal base 11 short in order to minimize the length of the moment arms between the existing cable 29 and the cables 50 and 51. The height of the ridge 15 above the horizontal base 11 is preferably 6.5 inches or less. Because these moment arms are short in the support member 10, the widths of the vertical side portions 12 and 14 and of the dividing portion 13 can be reduced to approximately the diameter of the roller 30 (FIG. 1), thereby providing a lightweight, but strong support block which maintains its shape without noticeable deformation despite heavy cable being pulled therethrough.

The bumper 20 is rigidly attached to the leading edge 17c (FIG. 1). The shortest distance between any two points on the bumper ends 20a and 20b is at least ¾ inch. The bumper 20 eliminates the possibility that cable will be damaged as the result of the leading edge 17c being pulled under the upper surface of an adjacent support block as the cables 50 and 51 are pulled. The bumper 20 is also useful in preventing cable lashing machinery from riding up over the support block and, as a consequence, damaging the cable.

To place the support block for stringing two cables in service, a man standing on the ground raises the support block to an existing suspended cable by means of a layup stick or similar hand-held installation pole, one end of which is inserted into a receiving means such as the lifting eye 18, and then drops the lip formed by the intersecting portions 16 and 17 onto the cable 29. Additional support blocks may then be hung from the cable. Once the support blocks have been hung, cable 50 or a rope attached thereto is passed sidewise through the opening between the opposing edges 12a and 16a and laid across the roller 30. Similarly, the cable 51 is passed sidewise through the opening between edges 14a and 17a and laid across the roller 30. The diameters of the cables 50 and 51 are essentially equal and are at least 3/16 inch but not greater than ¾ inch. With the cables 50 and 51 suspended from the rollers, the retaining pin 25 and the small piece of cable 28 may be inserted into the respective holes provided therefor. The cables 50 and 51 are then pulled through the support blocks and suspended under tension from utility poles. Once the cables have been secured to the utility poles by methods in common use, the support blocks are removed for use elsewhere.

MODIFICATION

In FIGS. 1-4, support blocks were shown and described for stringing two cables simultaneously. Because the weight of these support blocks has been kept to a minimum in order to facilitate the lifting and hanging of these blocks, the weight on either side of the dividing portion 13 must be balanced during most of the cable installation operation. Otherwise, these lightweight support blocks would become distorted and no longer operational. The embodiments of the invention described heretobefore require, for satisfactory operation, that two cables, one on either side of the dividing portion 13, be supported simultaneously. For stringing only one cable, a different support member 40 shown in FIGS. 5-6 is provided.

Figure 6:
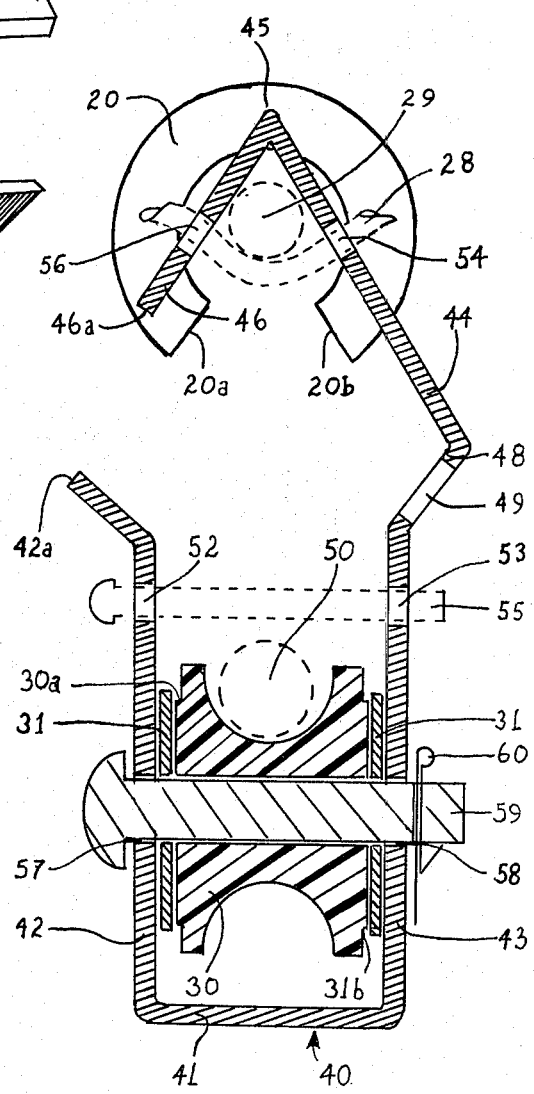
FIG. 6 is a cross-sectional view taken on line VI—VI of FIG. 5 on which are superimposed cross-sections of the existing cable and of a restraining means therefor and of the cable-to-be-strung and of a retaining pin therefor, the superimposed cross-sections being shown by broken lines.

As seen most clearly in FIG. 6, ridge 45 of the support member 40 is formed by the intersecting portions 44 and 46 and passes through a point which is approximately centered vertically above the center of gravity of the support block. In the support block for stringing one cable, however, unlike in the support block for stringing two cables, the center of gravity is in, or in close proximity to, the vertical plane which bisects the roller 30 radially.

Figure 5:
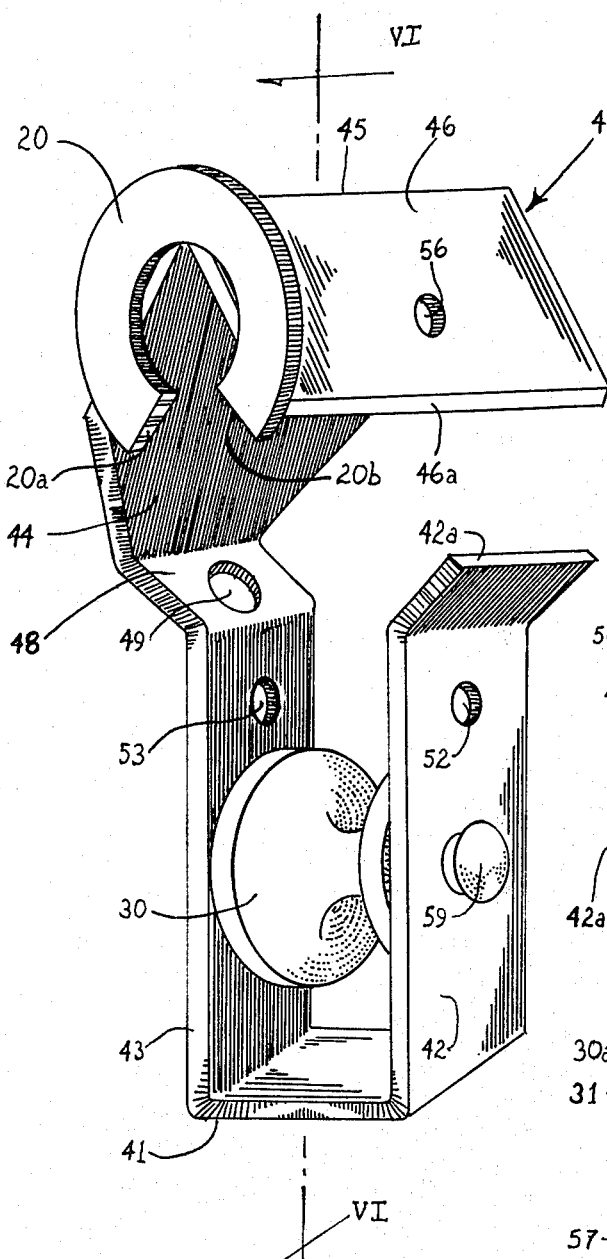
FIG. 5 is a perspective view showing one embodiment of the invention for stringing one cable.

As shown in FIG. 5, the support member 40 is a single, unitary piece which forms a nearly closed structure. The height of the edge 42a above the horizontal base 41 is limited by the necessity of keeping this height short in order to minimize the length of the moment arm between the existing cable 29 and the cable 50. The height of the ridge 45 above the horizontal base 41 is preferably 5.5 inches or less. The length of the ridge 45 is similar to that of the ridge 15 in FIG. 1. Likewise, the opposing edges 42a and 45a are separated from each other by a distance greater than the diameter of the cable 29.

A means for receiving one end of a layup stick or similar hand-held installation pole, such as an aperture 49, is formed in a section 48 which rises substantially vertically from and is disposed at an angle to the horizontal base 41. The means for receiving one end of an installation pole may also comprise a lifting eye or tab similar to those described herein for the support block for stringing two cables.

The connection to and operation within the vertical side portions 42 and 43 of the roller 30 and washers 31 is analogous to that of the rollers 30 and washers 31 in the support member 10. The maximum clearance between the proximate faces of the washers 31 and the support member 40 is 1/32th inch. A retaining pin 55 and holes 52 and 53 provided therefor, in addition to the vertical side portions 42 and 43, restrain the movement of the cable 50. An appropriate means such as a small piece of cable 28 may be inserted in holes 54 and 56 in order to restrain the movement of the support block relative to the cable 29.

A bumper 20 is rigidly attached to one of the leading edges of the support member 40 (FIG. 5). The shortest distance between any two points on the ends 20a and 20b is at least ¾ inch. The function of the bumper 20 is the same in both the one and two cable-stringing support blocks.

The method of using the support block for stringing one cable is similar to that of the support block for stringing two cables except that in the case of the former, only one roller 30 is centered beneath the ridge 45 and available on which to support the cable-to-be-strung; hence only one cable can be strung at a time in this embodiment of the present invention.

Although I have shown and described certain specific embodiments of my invention, I am well aware that many modifications thereof are possible.

What is claimed is:

1. A support block which is adapted to hang from an existing cable suspended laterally overhead for supporting cable during its installation which comprises:
   (a) a support member having an inverted V-shaped section, the upper ridge thereof being disposed parallel to the existing cable; portions of the support member which intersect to form the inverted V-shaped section being adapted to rest on the existing cable; the upper ridge being approximately centered above the center of gravity of the support block, so that the support block quickly assumes an equilibrium position once it is hung from the existing cable and rapidly returns to that position when it is displaced during the installation of cable;
   (b) a bumper which is rigidly attached to a leading edge of the support member, the bumper having a pair of end portions each of which extends over the leading edge and generally downwardly from the points of attachment of the bumper thereto, the end portions defining a passageway with a neck, the neck being of substantially narrower width than the distance between the intersecting portions of the inverted V-shaped section at the uppermost points of attachment of the end portions thereto, so that dislodgement of the support block from the existing cable, during any rotational motion of the support member relative to the existing cable, is impeded; the apex of the bumper being the highest point on the support block, thereby preventing the leading edges of either of two such adjacent support blocks from being pulled onto the upper surface of the other support block;
   (c) the support member having at least one opening, the opposing edges of the opening being separated from each other by a distance which is greater than the diameter of the cable being installed, so that the cable being installed can be passed sidewise through the opening; and
   (d) at least one roller connected to this support member, each roller supporting one and only one cable during its installation.

2. A support block as recited in claim 1 which further comprises two rollers connected to the support member, the center of gravity, during most of a cable installation, being approximately located between the proximate faces of two rollers, thereby providing a support block for stringing two cables simultaneously.

3. A support block as recited in claim 1 wherein the center of gravity, during most of a cable installation, is approximately located in a vertical plane which bisects the longitudinal axis of a roller, thereby providing a support block for stringing one cable.

4. A support block which is adapted to hang from an existing cable suspended laterally overhead for supporting cable during its installation which comprises:
   (a) a support member having an inverted V-shaped section, the upper ridge thereof being disposed parallel to the existing cable; portions of the support member which intersect to form the inverted V-shaped section being adapted to rest on the existing cable; the upper ridge being approximately centered above the center of gravity of the support block, so that the support block quickly assumes an equilibrium position once it is hung from the existing cable and rapidly returns to that position when it is displaced during the installation of cable;

(b) a bumper which is rigidly attached at spaced points to a leading edge of the support member, the bumper having a pair of end portions each of which extends over the leading edge and generally downwardly from the points of attachment of the bumper thereto, the end portions defining a passageway with a neck, the neck being of substantially narrower width than the distance between the intersecting portions of the inverted V-shaped section at the uppermost points of attachment of the end portions to said V-shaped section, so that dislodgement of the support block from the existing cable, during any rotational motion of the support member relative to the existing cable, is impeded; the apex of the bumper being higher than said portions of the support member which intersect to form the inverted V-shaped section, thereby preventing the leading edges of either of two such adjacent support blocks from being pulled onto the upper surface of the other support block;

(c) the support member having an angular frame; the frame defining a structure having opposing edges between which the cable being installed is passed sidewise; and (d) at least one roller connected to the support member, each roller supporting one and only one cable during its installation; the center of gravity, during most of a cable installation, being approximately located in a vertical plane which bisects the longitudinal axis of a roller.

* * * * *